United States Patent
Hunacek et al.

(10) Patent No.: US 11,586,776 B2
(45) Date of Patent: Feb. 21, 2023

(54) SECURING DATA STORED IN A MEMORY OF AN IOT DEVICE DURING A LOW POWER MODE

(71) Applicant: NAGRAVISION Sàrl, Cheseaux-sur-Lausanne (CH)

(72) Inventors: Didier Hunacek, Cheseaux-sur-Lausanne (CH); Marco Macchetti, Cheseaux-sur-Lausanne (CH); Jerome Perrine, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 80 days.

(21) Appl. No.: 17/270,872

(22) PCT Filed: Aug. 13, 2019

(86) PCT No.: PCT/EP2019/071764
§ 371 (c)(1),
(2) Date: Feb. 24, 2021

(87) PCT Pub. No.: WO2020/038785
PCT Pub. Date: Feb. 27, 2020

(65) Prior Publication Data
US 2021/0182435 A1 Jun. 17, 2021

(30) Foreign Application Priority Data
Aug. 24, 2018 (EP) .................................. 18190709

(51) Int. Cl.
*G06F 11/30* (2006.01)
*G06F 21/72* (2013.01)
*G06F 1/3234* (2019.01)
*G06F 21/60* (2013.01)
*G06F 21/81* (2013.01)
*H04L 9/08* (2006.01)
*G06F 12/14* (2006.01)

(52) U.S. Cl.
CPC ............ *G06F 21/72* (2013.01); *G06F 1/3275* (2013.01); *G06F 21/602* (2013.01); *G06F 21/81* (2013.01); *H04L 9/0841* (2013.01)

(58) Field of Classification Search
CPC ...... G06F 1/3275; G06F 21/602; G06F 21/72; G06F 21/81; H04L 9/0841
See application file for complete search history.

(56) References Cited

U.S. PATENT DOCUMENTS

| | | | |
|---|---|---|---|
| 9,596,235 B2* | 3/2017 | Badam | G06F 3/068 |
| 10,042,587 B1* | 8/2018 | Pedersen | G11C 16/10 |
| 2004/0037157 A1* | 2/2004 | Roohparvar | G11C 7/22 |
| | | | 365/233.1 |

(Continued)

FOREIGN PATENT DOCUMENTS

EP 1983497 A1 10/2008

*Primary Examiner* — Gary S Gracia
(74) *Attorney, Agent, or Firm* — Hoyng Rokh Monegier B.V.; David P. Owen

(57) ABSTRACT

The disclosure relates to a method for enabling the secure functions of a chipset (1) and especially the encryption of the content of the secure memory (7) when the device goes into low power mode. The content of the secure memory (7) may be encrypted and stored in an external memory (20) during low power mode of the chipset (1).

17 Claims, 6 Drawing Sheets

(56) References Cited

U.S. PATENT DOCUMENTS

| | | | | |
|---|---|---|---|---|
| 2010/0162053 A1* | 6/2010 | Gillingham | ............ | H03M 13/09 |
| | | | | 714/49 |
| 2011/0153910 A1* | 6/2011 | MacKenna | ......... | G06F 13/4234 |
| | | | | 711/E12.001 |
| 2012/0133484 A1* | 5/2012 | Griffin | ................ | G06F 3/04883 |
| | | | | 340/5.54 |
| 2012/0287741 A1* | 11/2012 | Ashizawa | ................ | G11C 7/12 |
| | | | | 365/203 |
| 2014/0006799 A1* | 1/2014 | Zmudzinski | ............ | G06F 21/81 |
| | | | | 713/189 |
| 2015/0143200 A1* | 5/2015 | Chinnakkonda Vidyapoornachary | ...................... | G06F 11/2015 |
| | | | | 714/770 |
| 2015/0338893 A1* | 11/2015 | Park | ....................... | G11C 16/30 |
| | | | | 713/323 |
| 2016/0132099 A1* | 5/2016 | Grabau | ................ | H04N 5/2256 |
| | | | | 713/323 |
| 2017/0039397 A1* | 2/2017 | Furuhashi | ............... | G06F 21/62 |
| 2017/0177381 A1* | 6/2017 | Altman | ................... | G06F 21/81 |
| 2017/0177870 A1* | 6/2017 | Hildebrand | ............. | G06F 21/57 |
| 2017/0214881 A1* | 7/2017 | Karn | .................. | H04N 1/00885 |
| 2018/0005223 A1* | 1/2018 | Terra | .................. | G06Q 20/341 |
| 2018/0375357 A1* | 12/2018 | Sultenfuss | ............ | H02J 7/0068 |
| 2020/0258573 A1* | 8/2020 | Chiang | ................... | H01L 27/24 |
| 2021/0182435 A1* | 6/2021 | Hunacek | ............... | G06F 21/602 |
| 2021/0263846 A1* | 8/2021 | Collonville | ........... | G06F 1/3275 |
| 2022/0102224 A1* | 3/2022 | An | .......................... | H01L 23/31 |
| 2022/0203933 A1* | 6/2022 | Wang | ................ | G07C 9/00309 |

\* cited by examiner

SECURING DATA STORED IN A MEMORY OF AN IOT DEVICE DURING A LOW POWER MODE

TECHNICAL FIELD

This disclosure generally relates to securing of data stored in a memory of a device. More specifically, this disclosure relates to Internet of Things (IoT) devices that can enter a low power mode, and securing data stored in a memory of the IoT device before, during and after the low power mode.

BACKGROUND ART

An IoT is a network of physical devices, appliances, or items embedded in electronics or software, which enables these objects to exchange data without human interaction. Recommendation ITU-T Y.2060 defines the IoT as a global infrastructure for the information society, enabling advanced services by interconnecting (physical and virtual) things based on existing and evolving interoperable information and communication technologies. A 'thing' in the terminology 'IoT' is considered an object of the physical world (physical things) or the information world (virtual things), which is capable of being identified and integrated into communication networks. In this definition, physical things exist in the physical world and are capable of being sensed, actuated and connected. Examples of physical things include the surrounding environment, industrial robots, goods and electrical equipment. In this definition, virtual things exist in the information world and are capable of being stored, processed and accessed. Examples of virtual things include multimedia content and application software.

In ITU-T Y.2060, an IoT device is considered a piece of equipment with the mandatory capabilities of communication and the optional capabilities of sensing, actuation, data capture, data storage and/or data processing. IoT devices typically communicate with other devices: they may communicate through the communication network via a gateway, through the communication network without a gateway, or directly without using the communication network. Also, combinations of communication scenarios are possible; for example, devices may communicate with other devices using direct communication through a local network (i.e., a network providing local connectivity between devices and between devices and a gateway, such as an ad-hoc network) and then communication through the communication network via a local network gateway.

The communication networks may transfer data captured by IoT devices to applications and other devices, as well as instructions from applications to devices. The communication networks typically provide capabilities for reliable and efficient data transfer. The IoT network infrastructure may be realized via existing networks, such as conventional TCP/IP-based networks, and/or evolving networks, such as next generation networks (NGN).

IoT devices may be build around an integrated circuit, e.g. in the form of a system on a chip (SoC). Such SoC may include a secure part including a secure memory, which may store data in a secured manner, typically accessible only to the secure part or through a security protocol.

To conserve power usage, IoT devices may enter a low power mode when not in use. In the low power mode, most parts of the IoT device may be turned off, except for parts needed to exit the low power mode or receive triggers to exit the low power mode. Typically, when an IoT device enters a low power mode, secure parts of the SoC such as a secure memory, are disabled and generated keys, e.g. random cryptographic keys, used for encryption and protection of data stored in the secure memory are typically lost. As a result, it is difficult to protect in a secure manner the data stored in the secure memory in the low power mode.

The secure memory may be protected using a global key stored in a non-volatile memory, thus remaining available in and after the low power mode. A disadvantage of using such global key is that a previous content of the secure memory, i.e. the data as stored in the secure memory prior to entering a low power mode, could be reloaded. Using a global key may thus result in a situation where there are no anti-replay countermeasures.

Furthermore, a secure part of an IoT device may be able to perform commands even before its security is completely initialized. This may lead to potentially insecure situations, in which the security of the IoT device is not ensured.

Another mechanism which is difficult to ensure is a secure and accurate clock. When the IoT device goes in low power mode typically the clock is lost or the IoT device relies on another component than the SoC for the clock which may not be secure.

SUMMARY

The present disclosure solves the above problems present in the prior art.

According to an aspect of the disclosure, a method is proposed wherein a memory content of a first memory of a secure part of a chipset can be secured during a low power mode. The low power mode can cause the memory content to be erased from the first memory. When entering the low power mode, at least a part of the memory content can be encrypted—optionally signed—to obtain an encrypted memory content. The encrypted memory content can be stored in an external memory external to the secure part during the low power mode.

In this way, the memory content of the first memory is secured even during low power mode. Furthermore, because the memory content is encrypted, the memory content is protected from malevolent or unauthorized use.

In an embodiment, when exiting the low power mode the encrypted memory content from the external memory can be received in the secure part. The encrypted memory content can be decrypted—and optionally authenticated—to obtain decrypted memory content and the decrypted memory content can be loaded in the first memory.

In this way, the memory content of the first memory can be loaded back into the first memory in a secured manner and thereafter possibly be used again.

In an embodiment, the chipset can be configured to set up a secure link between the secure part and a remote client access server. Furthermore, the secure part can be configured to receive a secure stamp from the client access server in the secure part via the secure link. Here the secure stamp can comprise data for securing the memory content. Also, the secure part can be configured to store the secure stamp in a second memory of the secure part, wherein the secure stamp can remain stored in the second memory in the low power mode. The secure part can be configured to encrypt the at least part of the content using the secure stamp when entering the low power mode. Furthermore, when exiting the low power mode the secure part can be configured to decrypt the encrypted memory content using the secure stamp.

In this way, the secure stamp is received over a secure link from the client access server and is thus protected from malevolent or unauthorized use. Also, it cannot be modified by an attacker. Furthermore, the secure stamp is retained by the secure part during the low power mode and can thus be used before and after the low power mode in order to perform security functions. Also, the secure stamp can be used to encrypt or decrypt the memory content.

In an embodiment, the chipset can be configured to remove the secure stamp from the second memory when the encrypted memory content is decrypted.

In an embodiment, the chipset can be limited in functionality until the secure stamp has been received via the secure link.

In this way, the connection to the client access server is enforced before performing any commands with the secure enclave. This furthermore ensures that the security functions can be applied in an optimal manner.

In an embodiment, a new secure stamp received after setting up of the secure link between the client access server and the secure part can be different from a previous secure stamp.

In this way, anti-replay attack on the memory content is enabled.

In an embodiment, the secure link between the client access server and the secure part can be implemented using a Diffie-Hellman key exchange protocol.

In this way, a secure link is obtained over which data can be exchanged in a secured manner between the client access server and the secure part. Here, the client access server knows that it is interfacing with a genuine chip and the secure part knows that it is connected to a genuine client access server.

In an embodiment, the secure stamp can comprise a timestamp.

In this manner it can provide an accurate clock to the chipset.

In an embodiment, the secure part can encrypt the memory content of the first memory based on a cryptographic algorithm using the secure stamp as an initialization vector to the cryptographic algorithm.

In this manner, anti-replay attack on the memory content is enabled.

In an embodiment, the secure part can be part of a trusted execution environment of the chip set.

In an embodiment, the trusted execution environment can control the storing of the encrypted memory content in the external memory when entering low power mode and controls loading of the encrypted memory content in the secure part when exiting low power mode.

In an embodiment, the secure part can generate a random key. Furthermore, when entering the low power mode, the trusted execution environment can encrypt computer code running in the trusted execution environment using the random key as cryptographic key and the secure stamp as initialization vector to obtain encrypted computer code. Furthermore, when exiting low power mode the trusted execution environment can decrypt the encrypted computer code using the random key as cryptographic key and the secure stamp as initialization vector.

In this way, the computer code running in the trusted execution environment can be retained in a secure manner during the low power mode. Furthermore, anti-replay memory attack on the computer code is enabled.

In an embodiment, the random key can be stored in the second memory.

In this way, the random key is retained during low power mode and can be used after low power mode to decrypt computer code.

In an embodiment, a further secure link can communicatively connect the secure part to the trusted execution environment. The further secure link can use a random shared key for cryptographically securing the further secure link.

In this way, the further secure link can be used to transmit data in a secure manner in between the trusted execution environment and the secure part.

In an embodiment, the random shared key can bind the random key to the secure stamp.

In this way, the random key and the secure stamp can be encrypted in a single operation.

In an embodiment, the further secure link can be re-initialized after each low power mode with a new random shared key.

In this way, the anti-replay attack is enabled.

In an embodiment, the further secure link can be implemented using a KeyProt protocol.

According to another aspect of the disclosure, a device is proposed that can comprise a processor configured to perform the steps of the method according to any one of the described embodiments.

According to another aspect of the disclosure, a device is proposed that can comprise an integrated circuit configured to perform the steps of the method according to any one of the described embodiments.

In an embodiment, the device can be an Internet of Things device.

According to another aspect of the disclosure, a computer program product is proposed, which can be implemented on a computer-readable non-transitory storage medium, wherein the computer program product can comprise computer executable instructions which, when executed by a processor, can cause the processor to carry out the steps of the method according to any of the described embodiments.

According to another aspect of the disclosure, a computer-readable non-transitory storage medium is proposed, which can comprise computer executable instructions, and which when executed by a processor can cause the processor to carry out the steps of the method according to any one of the described embodiments.

Hereinafter, embodiments will be described in further detail. It should be appreciated, however, that these embodiments may not be construed as limiting the scope of protection for the present disclosure.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

Where in the following examples reference is made to a client device, it is to be understood that the disclosure is not limited to application in client devices.

Figure 1:
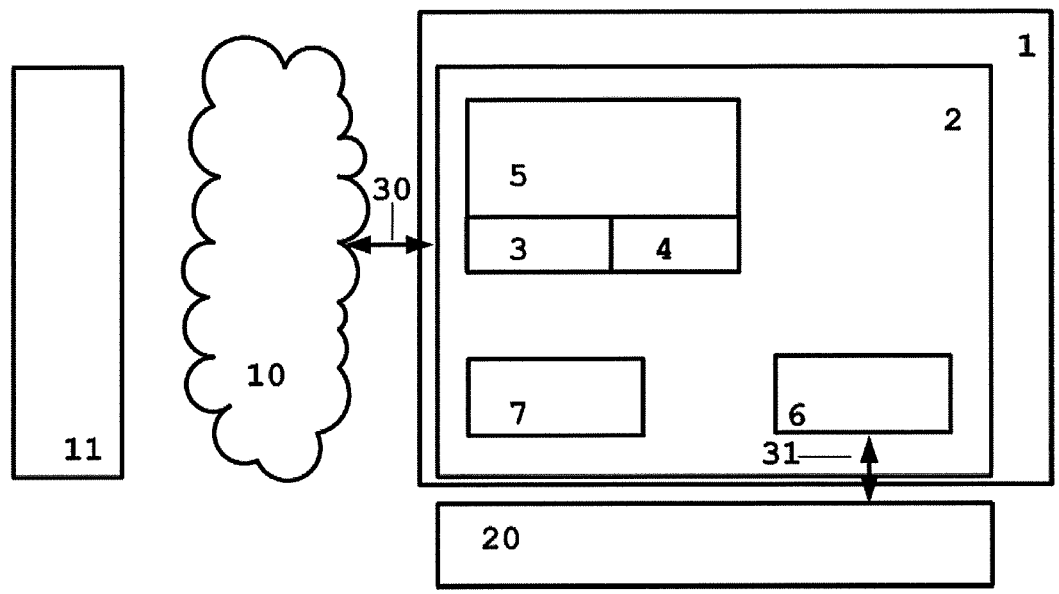
FIG. 1 shows an exemplary embodiment of a device connected to server via a network.

FIG. 1 shows an exemplary embodiment of a device 1, such as an IoT device, that is communicatively connected to a server via a network. The device may include a secure part, also called a secure enclave 2, which is typically the most secure hardware block on the SoC. The secure enclave is typically more secure than for example a trusted execution environment (TEE) on the SoC and may be a part of the TEE. The secure enclave 2 may have its own, independent secure boot process to ensure that it is completely secure and it may execute specific secure functions.

The secure enclave 2 may include a memory block 7, for example an internal RAM, to store data and code of the secure enclave 2. This memory block 7 is preferably only accessible by the secure enclave 2. Data stored in the memory block 7 may be lost when the device goes into a low power mode, since it usually is a type of volatile memory.

The secure enclave 2 may include one or more always-on registers 5, which are capable of storing data even when the device goes into the low power mode. These always-on registers 5 may for example store data that is needed immediately after the secure enclave 2 exits the low power mode. The always-on registers 5 may have a secure clock 3 and a key table 4. The secure clock 3 and the key table 4 may be positioned separately from the always-on registers 5.

The secure enclave 2 may send data to and receive data from an external memory 20. The external memory 20 is preferably a part of the device 1, but may alternatively be external to the device 1. The external memory 20 is configured to keep data stored when the device 1 enters the low power mode. Preferably, the external memory 20 is a non-volatile memory, allowing the external memory 20 to enter the low power mode together with the device 1. Alternatively, the external memory 20 may be a volatile memory, in which case the external memory 20 is not to be placed in a lower power mode when the device 1 goes into the low power mode to preserve its content.

The secure enclave 2 may include a cryptographic processor 6. The cryptographic processor 6 may be used to cipher (and optionally sign) or decipher (and optionally authenticate) code and data on the memory block 7 of the secure enclave 2. The cryptographic processor 6 is configured to execute a cryptographic function and may use as inputs a cryptographic key and, depending on the cryptographic function, an initialization vector (IV).

The device may be configured to communicate with an external client access server 11 via a network 10. The client access server 11 may be a server that is communicatively connected to multiple clients, including the device 1. In case the device 1 is an audio, video or other media related device, the network 10 may be an over the top (OTT) network, a digital video broadcast (DVB) network or other media related network. The device 1 may be an IoT device, in which case the network 10 additionally or alternatively includes characteristics of or is an IoT network.

In an embodiment, at boot time of the device the secure enclave 2 resets the always-on registers 5. Next, the secure enclave 2 initializes a secure link with the client access server 11. In this way, both the secure enclave 2 and the client access server 11 may be sure that the data over the secure link is communicated between the correct receiver and sender. An example of an implementation of such secure link between the client access server 11 and the secure enclave 2 is based on the Diffie-Hellman key exchange protocol. An embodiment using the Diffie-Hellman key exchange protocol in the context of the present disclosure will be described in more detail using FIG. 3.

Figure 3:
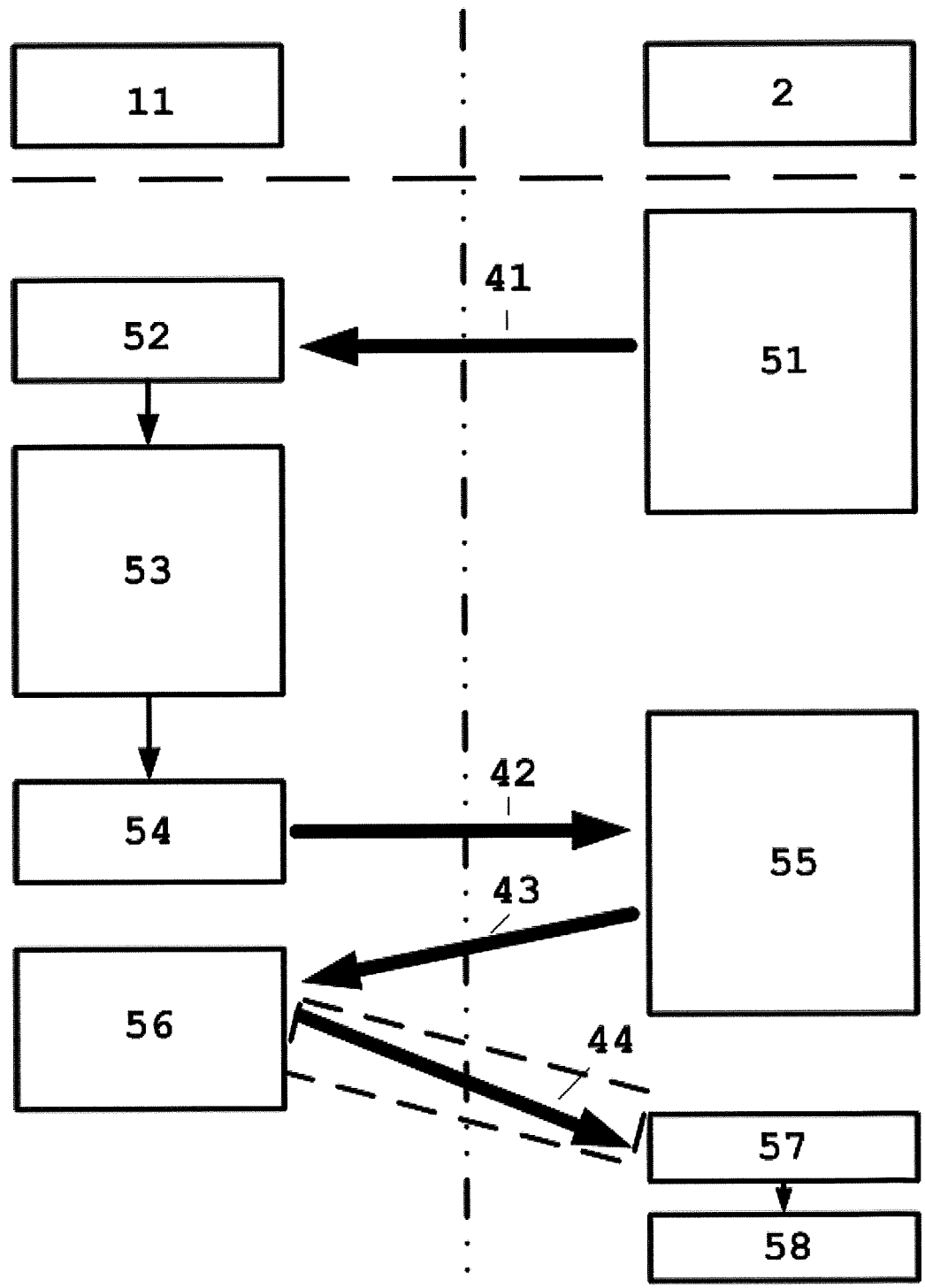
FIG. 3 shows a schematic depiction of an implementation of the Diffie-Hellman protocol.

FIG. 3 shows a schematic depiction of an example of an implementation of the Diffie-Hellman key exchange protocol. After the secure enclave 2 is for example prompted to initialize, the secure enclave generates 51 a random key pair, consisting of a private part of the key (private device key) and a public part of the key (public device key). This usually is a random key pair. The private device key may be a nonce (a number or bit string used only once for cryptography purposes). The public device key may be computed based on the private device key.

The secure enclave 2 transmits 41 the public device key to the client access server 11. This transmission may be direct, or may go via another, less secure part of the device 1. The secure enclave 2 may also transmit its unique ID or the unique ID of the device 1 to the client access server 11. The secure enclave 2 may also transmit its secure enclave certificate to prove it is an authenticated device. The client access server 11 may check this unique ID belonging to the device 1 or the secure enclave 2 to verify the identity of the secure enclave 2 that is trying to establish a secure link with the client access server 11, and probably verify that the unique ID belongs to an actual produced chip. Furthermore, the secure enclave 2 may sign the transmission 41 with a signature, for example based on a Public Key Infrastructure known by both the client access server and the device. The device can use its private PKI key to sign the message This may be used to check authentication, non-repudiation and that the message has not been altered after transmission.

Upon receiving the transmission 41, the client access server 11 checks the parameters of the transmission 42. This means for example checking the signature or the unique ID transmitted by the secure enclave 2.

Next, the client access server 11 generates 53 a key pair, consisting of a private part of the key (private server key) and a public part of the key (public server key). This may be a random key pair. The private server key may be a nonce, and the public server key may be computed based on the private server key.

Next, the client access server 11 may compute 54 a secure link key, based on the public device key and the private server key. This secure link key may be used to secure the secure link to be formed between the client access server 11 and the secure enclave 2.

The client access server 11, upon computing the secure link key, transmits 42 the public server key to the secure enclave 2. This transmission 42 may be performed via a less secure part of the device 1, or directly to the secure enclave 2. The client access server 11 may also transmit its server certificate, which is used to prove that the public server key sent via the transmission 42 is indeed owned by the client access server 11. Furthermore, the client access server 11 may sign the transmission 42 with its signature, for example based on Public Key Infrastructure known by both the client access server and the device.

Upon receiving the transmission 42, the secure enclave 2 checks 55 the parameters of the transmission 42 (signature, server certificate) and computes the secure link key based on the private key of the secure enclave 2 and the public key of the client access server 11. Now, both the secure enclave 2 and the client access server 11 agree on the secure link key. This key may then be used to encrypt and decrypt data transmitted over the secure link between the secure enclave 2 and the client access server 11.

The secure enclave 2 may send 43 a secure enclave certificate, for example signed with a signature upon computing the secure link key, to show for example that the secure enclave 2 has computed the secure link key.

Once the secure link between the client access server 11 and the secure enclave 2 has been established (after checking 56 the parameters of transmission 43), the client access server 11 may send 44 to the secure enclave 2 a secure stamp (possibly signed with a signature). Because the secure stamp is send via the secure link, only the secure enclave 2 that set up the secure link has access to the secure stamp. This ensures that the secure stamp cannot be captured or modified by a potential attacker. The secure stamp contains data that enables secure functions of the secure enclave 2. In particular, it enables encryption of data stored in the memory block 7 when the device enters low power mode.

The secure stamp may include a random number. Alternatively or additionally, the secure stamp may include a timestamp indicative of a date and/or time. The advantage of using a timestamp is that the secure stamp may also be used as a clock signal to the device 1 at boot time and/or when exiting a low power mode. For example, the secure clock 3 may be set or updated based on the timestamp.

Once the secure link between the client access server 11 and the secure enclave 2 has been established and the secure stamp has been received by the secure enclave 2 and the parameters of the transmission 44 have been checked 57, the secure stamp is typically stored 58 in the always-on registers 5 and the secure enclave 2 is initialized.

Next, the secure functions of the secure enclave 2 may be enabled. It is possible to allow the secure functions of the secure enclave 1 only to be enabled after establishing the secure link with the client access server 11 and receiving the secure stamp. This has the benefit that, since the secure stamp is used to encrypt the data on the memory block 7, that the secure stamp is set before the secure functions of the secure enclave 2 are enabled, making sure that for example if needed the data on the memory block 7 may be encrypted.

After the initialization, the secure enclave 2 may generate a random key (KSE) that may be used by the secure enclave 2 to encrypt its own content, such as the data in the memory block 7. This random key (KSE) may be stored in the always-on registers 5, for example in the key table 4.

When entering a low power mode, the device limits the amount of power going to certain part of the device. As a result, the data stored in the memory block 7 may be erased. To preserve the data of the memory block 7, the memory content of the memory block 7 may be stored on the external memory 20 in a secure manner before getting erased. The secure enclave 2 will typically be allowed to go into low power mode only once the secure stamp has been received from the client access server 11.

When entering low power mode, the secure enclave 2 may encrypt the content on the memory block 7 using the cryptographic processor 6. The cryptographic function performed by the cryptographic processor 6 may be performed using the random key (KSE) as cryptographic key and the secure stamp as IV. Optionally, the cryptographic processor 6 may also sign the encrypted content.

The encrypted content is then stored 31 in the external memory 20, after which the secure enclave 2 may go into low power mode.

When the secure enclave 2 exits the low power mode, e.g. after receiving a wake-up trigger in the form of a wake-up data packet, it may perform actions to recover the content and re-initialize itself based on its internal ROM code. Hereto, the encrypted content that was stored on the external memory 20 may be received by the secure enclave 2, after which the cryptographic processor 6 may decrypt the content. For the decryption, the random key (KSE) may be used as cryptographic key and the secure stamp may be used as IV again, which are available from the always-on registers 5 which were not erased during the low power mode. The cryptographic processor 6 may authenticate the content in case the encrypted content has been signed.

After the decryption has been completed by the cryptographic processor 6, the decrypted content may be stored into the memory block 7. The memory content of the memory block 7 that was stored in the external memory 20 during the low power mode may thus safely and securely be recovered.

Next, the secure enclave 2 may flush the secure stamp register, i.e. remove the secure stamp form the always-on registers 5. This forces the secure enclave 2 to be reactivated by initializing a new secure link between the client access server 11 and the secure enclave 2, to thereby obtain a new secure stamp before the next low power mode. This secure link may again be implemented by using the Diffie-Hellman protocol as described above.

The new secure stamp is preferably different from the last secure stamp to allow the memory content to be encrypted differently with each low power mode. This advantageously enabled an anti-replay attack on the secure memory. In case the new secure stamp includes a new up-to-date timestamp, it may be used to (re)set the clock of the device to the correct time.

Figure 2:
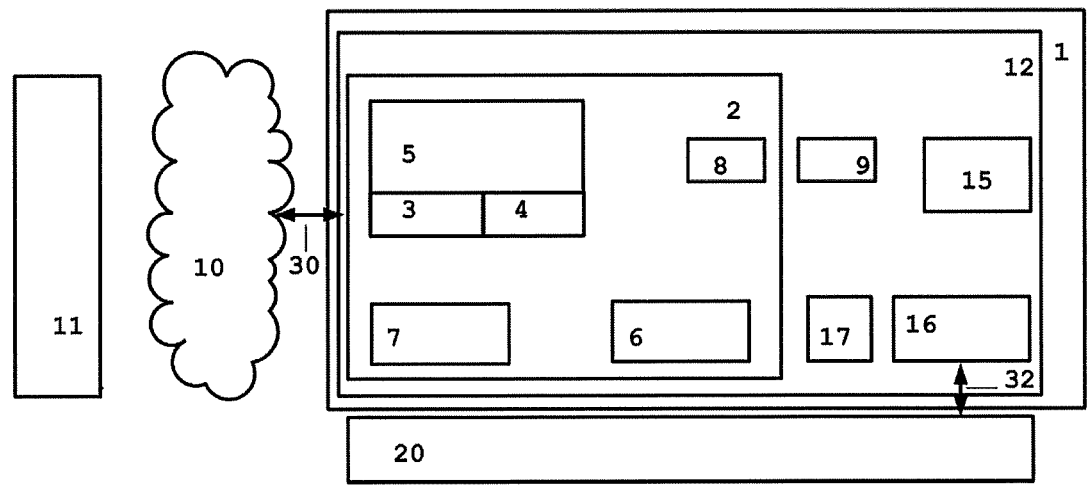
FIG. 2 shows another exemplary embodiment of a device connected to server via a network.

FIG. 2 shows another exemplary embodiment of a device 1, such as an IoT device, that is communicatively connected to a server via a network. This exemplary embodiment may have all or parts of the functionality described above. In this embodiment a secure part or secure enclave 2 is part of a TEE 12. The TEE 12 is a part of the device 1 and may be embedded in a SoC. The TEE 12 provides a data isolation between untrusted applications running on a rich execution environment of the device 1 and trusted applications running on the TEE 12. The TEE 12 is considered less secure than the secure part or secure enclave 2, but typically has more functionality.

The TEE 12 may have its own memory block 17, containing code or data of the TEE 12. This code or data needs to be protected as well during low power mode of the device 1. The memory block 17 may be an internal RAM. In that case, data stored in the memory block 17 may be lost when the device 1 goes into a low power mode, since it is a type of volatile memory. Alternatively, the memory block 17 may be a type of non-volatile memory. In that case, data stored in the memory block 17 may be retained when the device 1 goes into a low power mode.

The TEE 12 further may have a key table 15, which is a memory block that may stores cryptographic keys of the device 1. Cryptographic keys may first be encrypted and signed before being stored in the key table 15.

The TEE 12 may also include a cryptographic processor 16. The cryptographic processor 16 may be used to cipher (and optionally sign) or decipher (and optionally authenticate) code and data on the memory block 17 of the TEE 12.

The cryptographic processor 16 is configured to execute a cryptographic function and may use as inputs a cryptographic key and, depending on the cryptographic function, an initialization vector (IV).

The initialization of the secure enclave 2 may be performed in the same manner as in the embodiment of FIG. 3 and discussed above, or in the manner depicted in FIG. 4.

Figure 4:
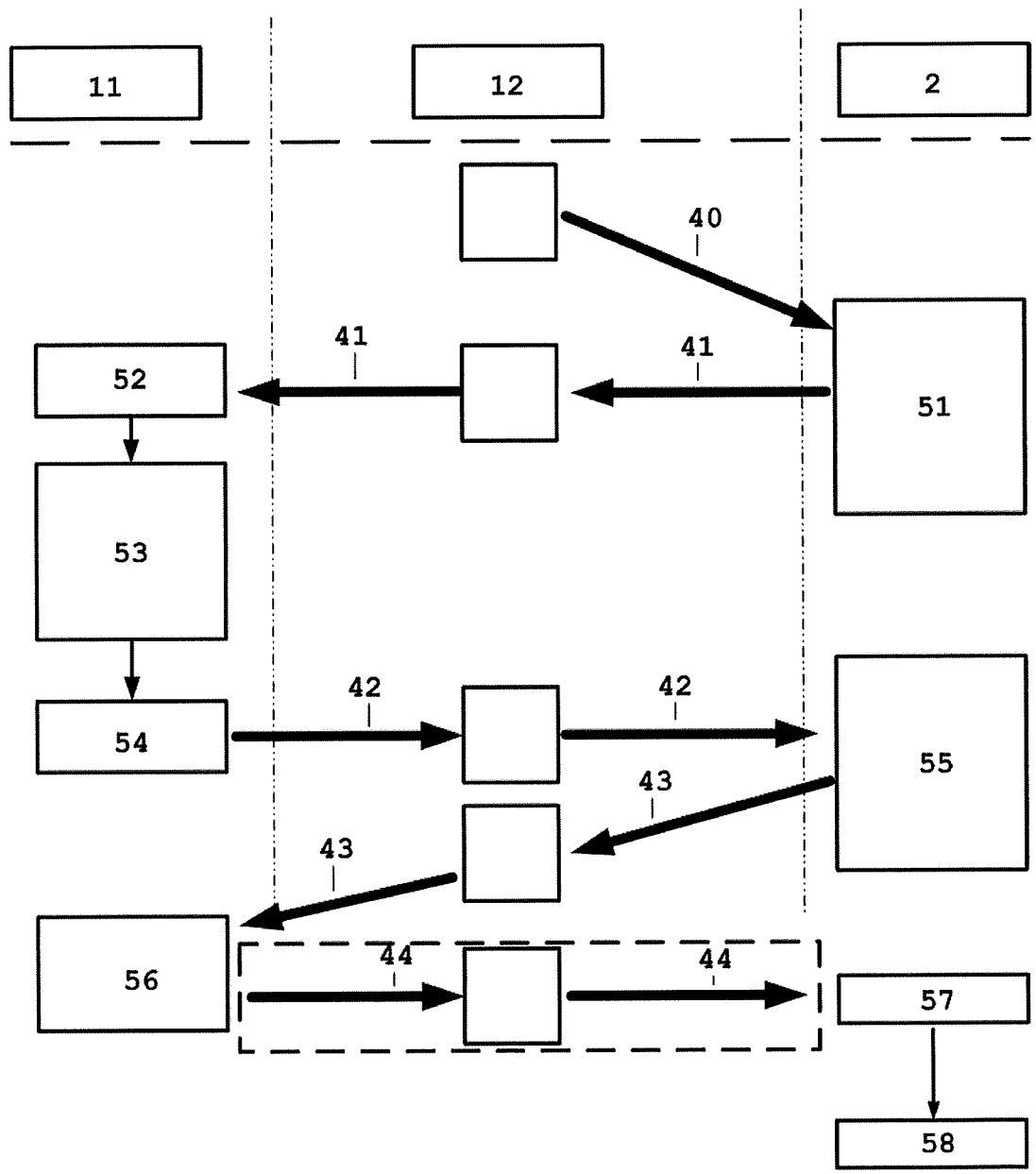
FIG. 4 shows a schematic depiction of an implementation of the Diffie-Hellman protocol, through the TEE.

FIG. 4 shows a schematic depiction of an implementation of the Diffie-Hellman protocol, through the TEE. The steps are the same as in FIG. 3 and discussed above. However, the TEE starts the initialization process by sending 40 an initialization request to the secure enclave.

The transmissions 40, 41, 42, 43, 44 may go through the TEE, or only a selection of the transmissions 40, 41, 42, 43, 44 may be transmitted via the TEE. The rest of the procedure is the same as in the embodiment of FIG. 3 and will not be repeated here. At the end of the protocol, the secure enclave 2 is initialized.

After the initialization of the secure enclave 2, the secure enclave 2 may also generate a random key (KTEE) that may be used by the TEE 12 to encrypt its own content, such as the data in the memory block 17. This random key (KTEE) may be stored in the always-on registers 5 in the secure enclave 2, for example in the key table 4. This random key KTEE may be generated at the same moment as when the secure enclave 2 generates the random key KSE, but it may also be generated at a different time.

Both the TEE 12 and the secure enclave 2 in this embodiment may have a KeyProt block (9 and 8 respectively). These blocks are used to protect a secure enclave key (for example the key KTEE) from TEE 12 access or other parts that are generally less secure of the device 1, such as an REE (rich execution environment).

The KeyProt blocks 8,9 are used to enable a KeyProt mechanism. This KeyProt mechanism is for example described in International Patent Application Publication WO 2015/007549 A1, and will be described in more detail below.

During initialization of the secure enclave 2, the KeyProt blocks 8,9 may also be initialized. The two blocks 8,9 are able to generate a random shared key KP, which is shared between the two KeyProt blocks 8,9. In this way a secure link is formed, data may be encrypted and decrypted using this random shared key KP.

An advantage of using the KeyProt mechanism is that the data transferred over the secure link formed by the KeyProt mechanism is fully secured, therefore this data does not transit over this path from the secure enclave 2 to the TEE 12 under a non-protected form.

The KeyProt mechanism is just one example of a possible secured link between the secure enclave 2 and the TEE 12. Any other method may be applied in order to form a secure link between the secure enclave 2 and the TEE 12. Furthermore, a link may be formed that is not secured.

When entering low power mode, the secure enclave 2 encrypts the random key KTEE using the random shared key KP. Furthermore, the secure enclave 2 may transfer on the random key KTEE the secure stamp. Once transferred onto the random key KTEE the secure stamp may be kept in the clear or be encrypted by using the random shared key KP. Preferably, the random key KTEE and the secure stamp will be encrypted in a single operation by using the random shared key KP.

The TEE 12 may store the received encrypted KTEE and the secure stamp in the key table 15, either in encrypted or decrypted form. The TEE 12 may use the decrypted random key KTEE and the secure stamp to protect its own code and data, using the crypto processor 16. The cryptographic function performed by the cryptographic processor 16 may be performed using the random key (KTEE) as cryptographic key and the secure stamp as IV. Optionally, the cryptographic processor 16 may also sign the encrypted content.

The encrypted content may optionally be stored 32 in the external memory 20, after which the TEE 12 may go into low power mode.

When the device 1 exits the low power mode, the secure enclave may be waked up by the TEE 12, e.g. after receiving a wake-up trigger in the form of a wake-up data packet, and based on its ROM code may initialize the KeyProt blocks 8,9 to enable the KeyProt mechanism. In this way, a new random shared key KP is generated, which is again shared by the secure enclave 2 and the TEE 12. In the same manner as before, the secure enclave may encrypt and bind the KTEE and the secure stamp stored in the always-on registers using the new random shared key KP. This new encrypted KTEE and secure stamp may be stored by the TEE in the key table 15.

If the encrypted content was stored on the external memory 20, it may be received 32 by the TEE 12. When the encrypted content is available to the TEE 12, the cryptographic processor 16 may decrypt the content. For the decryption, the random key (KTEE) may be used as cryptographic key and the secure stamp may be used as IV again, which are available from the key table 15. The cryptographic processor 16 may authenticate the content in case the encrypted content has been signed.

After the decryption has been completed by the cryptographic processor 16, the decrypted content may be stored into the memory block 17. The memory content of the memory block 17 that was stored in the external memory 20 during the low power mode may thus safely and securely be recovered.

Figure 5:
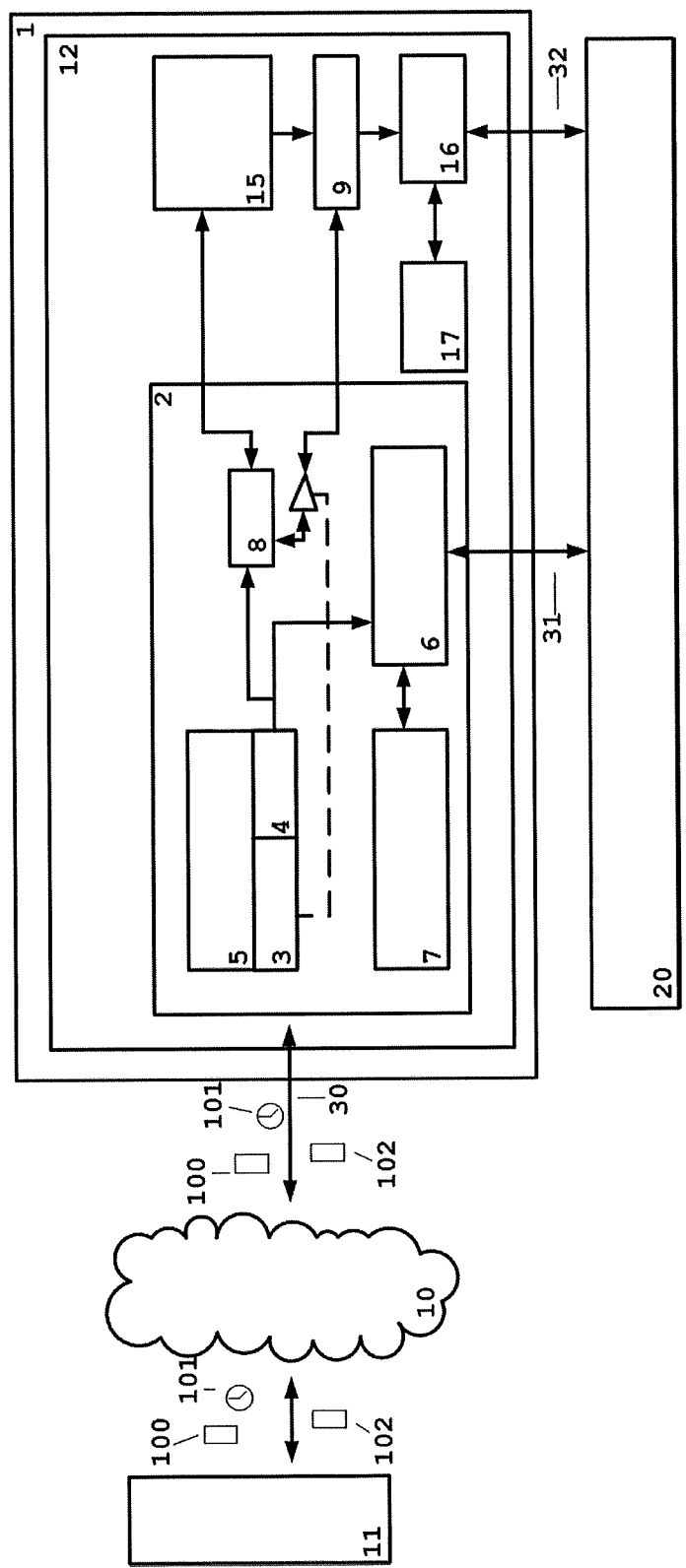
FIG. 5 shows the dataflow of the embodiment of FIG. 2 in a more detail.

FIG. 5 shows some examples of the dataflow of the embodiment of FIG. 2 in a bit more detail. More dataflow paths may exist.

The memory block 7 and the cryptographic processor 6 of the secure enclave 2 may transmit data to each other. So may the memory block 17 and the cryptographic processor 16 of the TEE 12. The key table 4 of the always-on register 5 may transmit data to the KeyProt block 8 and the cryptographic processor 6. In the KeyProt mechanism, for example in the communication between the KeyProt blocks 8,9, input from the secure clock 3 may be used or output may be generated for the secure clock 3. The KeyProt block 8 may communicate with the key table 15. The key table 15 may communicate with the KeyProt block 9. The KeyProt block 9 may communicate with the cryptographic processor 16.

Data that may be shared between the client access server 11 and the device 1 may include a client access server certificate 100, the secure stamp 101 and the secure enclave certificate 102. The client access server certificate 100 and the secure enclave certificate 102 may be send without a secure link present between the secure enclave 2 and the client access server 11.

Figure 6:
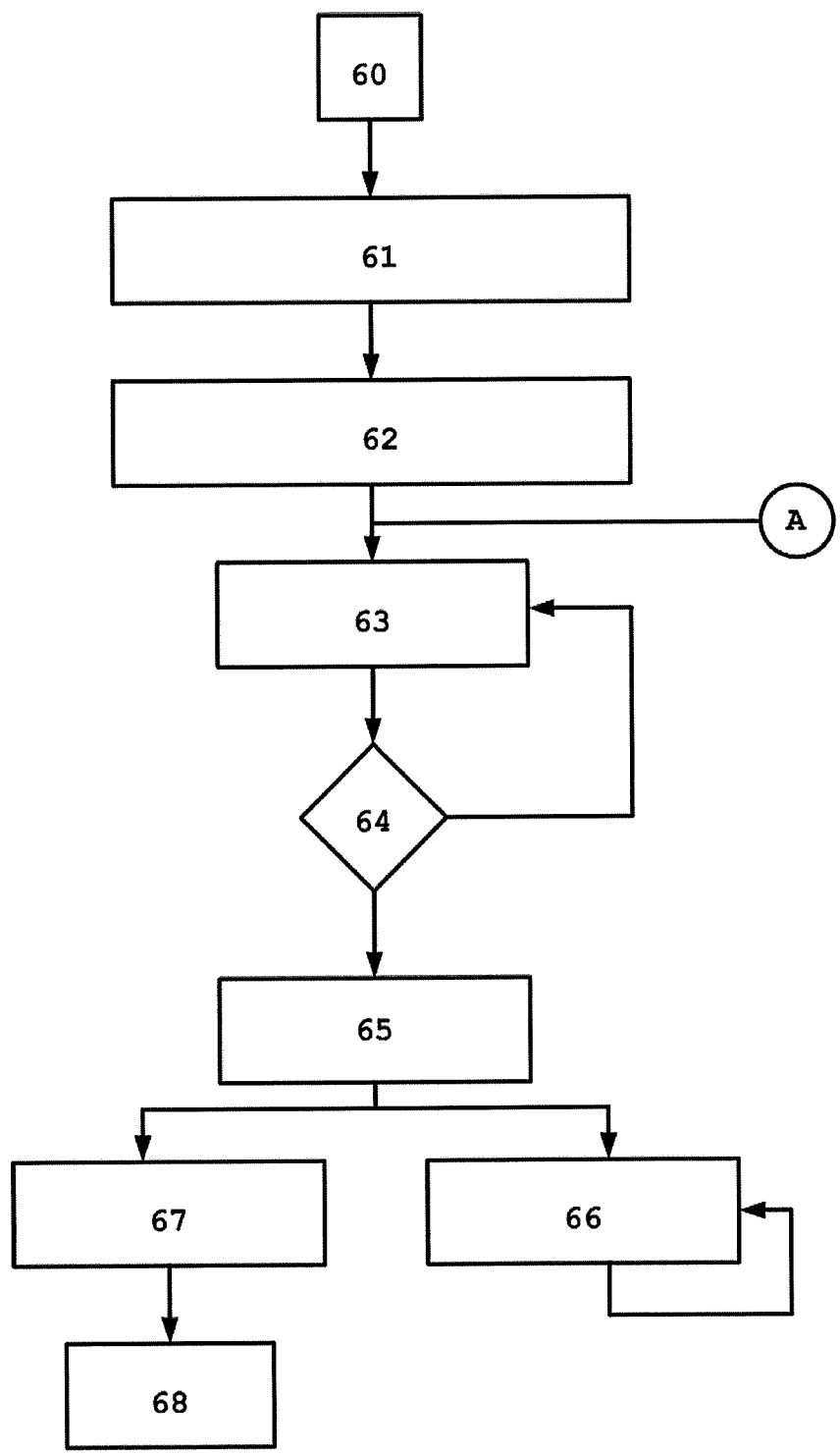
FIG. 6 is a schematic representation of a secure enclave initialization protocol.

FIG. 6 is a schematic representation of a secure enclave initialization protocol.

At step 60, the secure enclave 2 is prompted to reset or initialize. In step 61, the secure enclave 2 resets or initializes the always-on registers. Next, in step 62, the secure enclave 2 resets or initializes the random shared key KP of the KeyProt blocks 8,9.

In step 63, the secure link between the secure enclave 2 and the client access server 11 is initialized. After the secure link has been set up, the secure stamp is provided by the client access server 11 to the secure enclave 2. In step 64, the secure enclave 2 checks whether step 63 went without problems. If there were issues, step 63 is redone. If there were no problems, the secure enclave 2 continues in step 65 with storing the secure stamp into the always-on registers 5.

In step 66, the secure enclave 2 may continually update the secure stamp. This may happen at fixed or variable intervals, or when prompted to do so.

In step 67, the secure enclave 2 generates random keys (KSE, KTEE) and stores them into the always-on registers 5. Once this is done, in step 68 the secure enclave 2 has reached the end of its initialization protocol.

Figure 7:
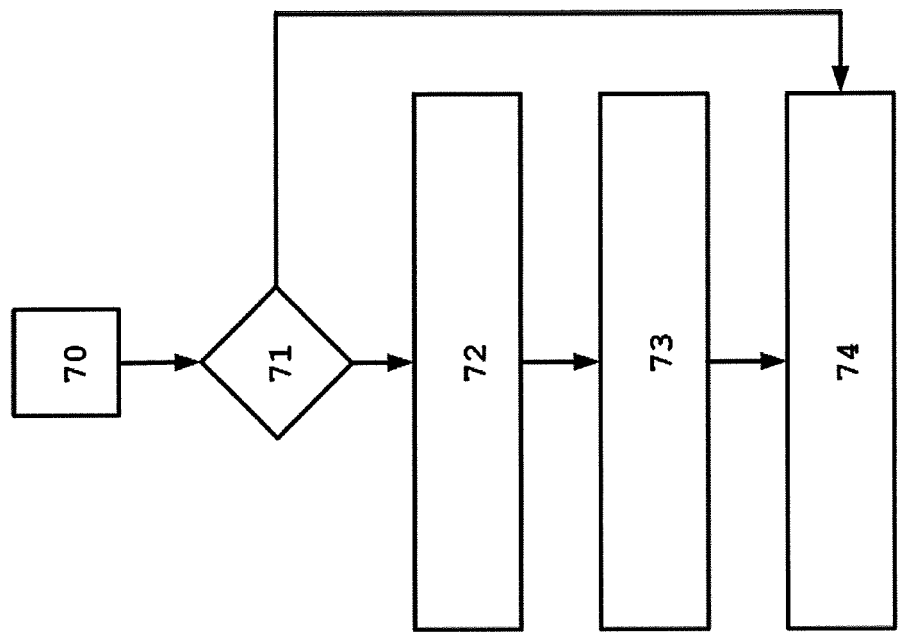
FIG. 7 is a schematic representation of a protocol when the device goes into low power mode.

FIG. 7 is a schematic representation of a protocol when the device goes into low power mode.

At step 70, the secure enclave 2 is prompted to go into low power mode. In step 71, the secure clock value is checked. If the secure clock value is not a particular value (e.g. zero) then the secure enclave 2 may proceed with step 72. If the secure clock value is the particular value (e.g. zero) then the secure enclave may proceed with step 74 (see below).

In step 72, the secure enclave may encrypt and possibly sign its internal memory with the random key KSE and store it into the external memory 20. Next, in step 73, the secure enclave may encrypt the random key KTEE with the KeyProt mechanism and store it into the TEE key table 15. This KTEE may then be used to encrypt the computer code of the TEE 12.

Next, in step 74, the secure enclave 2 enters in low power mode and waits for a prompt to exit the low power mode.

Figure 8:
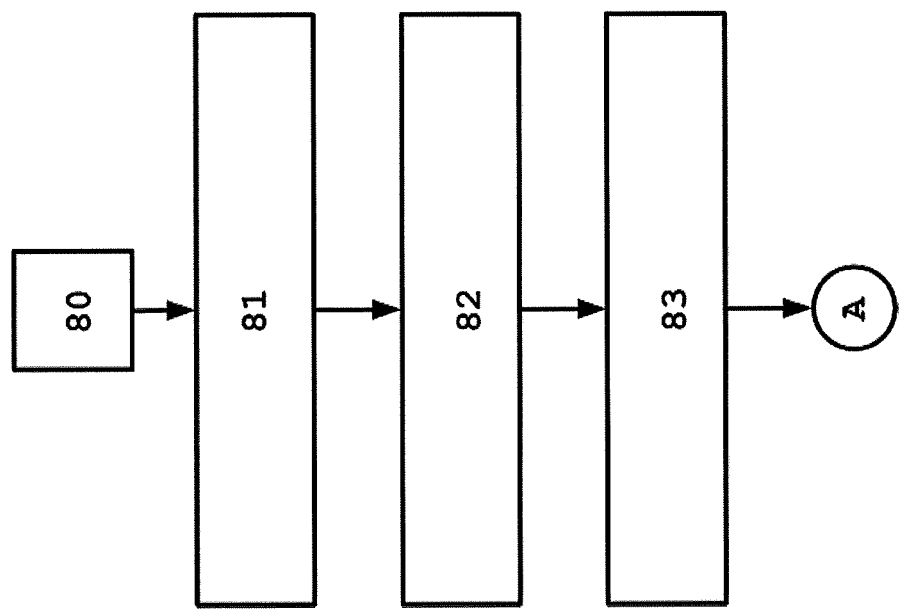
FIG. 8 is a schematic representation of a protocol when the device exits out of the low power mode.

FIG. 8 is a schematic representation of a protocol when the device exits out of the low power mode.

At step 80, the secure enclave 2 is prompted to go out of the low power mode. In step 81, the secure enclave resets or initializes the random shared key KP of the KeyProt mechanism. Then the secure enclave 2 outputs the KTEE encrypted with the KeyProt and also outputs the secure stamp. The KTEE and the secure stamp may be used to decrypt the computer code of the TEE 12.

Next, in step 82, the secure enclave 2 decrypts and possibly authenticates the external memory 20 with the KSE and the secure stamp as initialization vector and stores it into the memory block 7.

Next, in step 83 the secure enclave 2 flushes the secure stamp register in the always-on registers 5.

Finally, from step A the secure enclave 2 goes through the initialization protocol, starting with step 63.

One or more embodiments may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media, e.g., hard disk drive or any type of solid-state random-access semiconductor memory, flash memory, on which alterable information may be stored.

Two or more of the above embodiments may be combined in an appropriate manner.

The invention claimed is:

1. A method of securing a memory content of a first memory of a secure part of a chipset during a low power mode, wherein the low power mode causes the memory content to be erased from the first memory, comprising:
   when entering the low power mode, encrypting and optionally signing at least a part of the memory content to obtain an encrypted memory content and storing the encrypted memory content in an external memory external to the secure part during the low power mode.

2. The method according to claim 1, further comprising:
   when exiting the low power mode, receiving in the secure part the encrypted memory content from the external memory, decrypting and optionally authenticating the encrypted memory content to obtain decrypted memory content, and loading the decrypted memory content in the first memory.

3. The method according to claim 2, wherein the chipset is configured to:
   set up a secure link between the secure part and a remote client access server;
   receive a secure stamp from the client access server in the secure part via the secure link, wherein the secure stamp comprises data for securing the memory content;
   store the secure stamp in a second memory of the secure part, wherein the secure stamp remains stored in the second memory in the low power mode;
   when entering the low power mode, encrypt the at least part of the content using the secure stamp; and
   when exiting the low power mode, decrypt the encrypted memory content using the secure stamp.

4. The method according to claim 3, wherein the method comprises removing by the chipset, the secure stamp from the second memory when the encrypted memory content is decrypted.

5. The method according to claim 3, wherein the method comprises receiving a new secure stamp received after setting up of the secure link between the client access server, and the secure part being different from a previous secure stamp.

6. The method according to claim 3, wherein the method comprises implementing the secure link between the client access server and the secure part using a Diffie-Hellman key exchange protocol.

7. The method according to claim 3, wherein the method comprises using a timestamp as secure stamp.

8. The method according to claim 3, wherein the method comprises encrypting, by the secure part, the memory content of the first memory based on a cryptographic algorithm using the secure stamp as an initialization vector to the cryptographic algorithm.

9. The method according to claim 2, wherein the method comprises using the secure part as part of a trusted execution environment of the chipset.

10. The method according to claim 9, wherein the method comprises controlling, by the trusted execution environment, the storing of the encrypted memory content in the external memory when entering low power mode and controlling the loading of the encrypted memory content in the secure part when exiting low power mode.

11. The method according to claim 9, further comprising:
    the secure part generating a random key;
    when entering the low power mode, the trusted execution environment encrypting computer code running in the trusted execution environment using the random key as cryptographic key and the secure stamp as initialization vector to obtain encrypted computer code; and when exiting low power mode, the trusted execution environment decrypting the encrypted computer code using the random key as cryptographic key and the secure stamp as initialization vector.

12. The method according to claim 11, further comprising storing the random key in the second memory.

13. The method according to claim 11, wherein the method comprises communicatively connecting with a further secure link, the secure part to the trusted execution environment, the further secure link using a random shared key for cryptographically securing the further secure link.

14. The method according to claim 13, wherein the method comprises binding the random key to the secure stamp by the random shared key.

15. The method according to claim 13, wherein the method comprises re-initializing the further secure link after each low power mode with a new random shared key.

16. A device comprising a processor configured to perform the steps of the method according to claim 1.

17. A computer-readable non-transitory storage medium comprising computer executable instructions which, when executed by a processor, cause the processor to carry out the steps of the method according to claim 1.

* * * * *